Figure 1:
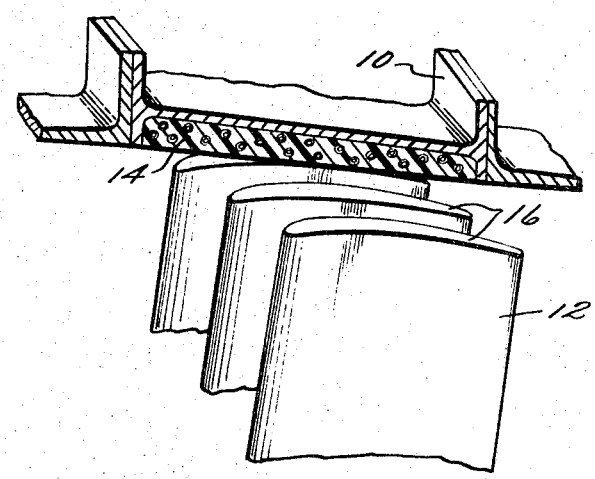

United States Patent

[11] 3,547,455

[72] Inventor John Edward Daunt
 Albuquerque, N. Mex.
[21] Appl. No. 821,433
[22] Filed May 2, 1969
[45] Patented Dec. 15, 1970
[73] Assignee General Electric Company
 a corporation of New York

[54] ROTARY SEAL INCLUDING ORGANIC ABRADABLE MATERIAL
 3 Claims, 2 Drawing Figs.

[52] U.S. Cl. .................................................. 277/96,
 415/174
[51] Int. Cl. .................................................. F16j 15/54
[50] Field of Search .......................................... 277/96, 53;
 415/174, 170; 177/(Micro Ballow Digest)

[56] References Cited
UNITED STATES PATENTS
2,797,139 6/1957 Veach ....................... 161/Micro Ballow
2,797,201 6/1957 Veach et al. ............... 161/Micro Ballow
2,944,821 7/1960 Mason ....................... 161/Micro Ballow
3,052,967 9/1962 Fischer .......................... 29/182
3,313,476 4/1967 Ross .............................. 415/174
3,389,921 6/1968 Lojkutz ......................... 277/96

Primary Examiner—Laverne D. Geiger
Assistant Examiner—Robert I. Smith
Attorneys—Derek P. Lawrence, E. S. Lee, III, Lee H. Sachs, Frank L. Neuhauser and Oscar B. Waddell ABSTRACT: A relatively low temperature operating seal has improved stability, flexibility and sealing through use of a nonmetallic organic lightweight abradable material between relatively moving members. One member includes a projection which cooperates with the abradable material on the other member. The abradable material is the reaction product of a mixture of a catalyzed epoxy or modified epoxy resin and hollow organic particles.

INVENTOR.
JOHN E. DAUNT
BY
ATTORNEY—

ROTARY SEAL INCLUDING ORGANIC ABRADABLE MATERIAL

ROTARY SEAL INCLUDING ORGANIC ABRADABLE MATERIAL

In the design of power producing apparatus such as gas turbine engines, attempts are made to prevent fluids at different pressures from mixing. In gas turbine engines, such fluids include air at different pressures, oil mists and products of combustion such as are found in the aft portions of an engine.

Rotary seals such as of the labyrinth or honeycomb type are frequently used between the relatively rotating members in cooperation or in intimate juxtaposition one with the other. For example, such seals are used between gas turbine stationary structural members and a rotating shaft or ring. In addition, they are used between the tips of outer covers of radially extending blading members and a casing or ring cooperating with such members.

The efficiency of the seal and hence the efficiency of the component served by the seal is dependent in part upon the dimensional tolerances maintained between the cooperating seal members. For this purpose, metallic abradable seal materials have been used in gas turbine engines to provide a fluid seal while at the same time avoiding damage between cooperating members such as the tops of blading members, the teeth of labyrinth structures or the partitions of honeycomb.

Metallic abradable materials such as in the form of meshed wires, or porous metal along or as packing for honeycomb have been used as abradable seal materials. However, it has been found that through the use of metallic materials, a certain amount of wear or abrasion of the cooperating member occurs. In addition, the relatively high processing temperature required to manufacture such metallic abradable materials creates problems of distortion and dimensional inaccuracy in the seal structure. As a result of such high processing temperature requirements, the abradable seal material is difficult to repair or patch after assembly in an engine or in an engine component.

It is a principal object of the present invention to provide a rotary seal including an improved abradable material which is strong, flexible, light in weight and easily patched or repaired.

Another object is to provide such a seal, the abradable material of which is organic in nature, which will not abrade cooperating seal members and which is combustible so that it can pass freely through the combustion zone of a gas turbine engine without damage.

These and other objects and advantages will be more fully understood from the following detailed description and examples which are meant to be typical of rather than limiting on the invention's scope.

Figure 2:
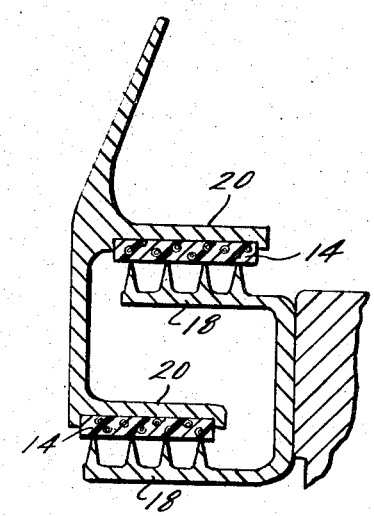

In the drawing:

FIG. 1 is an isometric fragmentary partially sectional view of blading members cooperating with a shroud; and FIG. 2 is a fragmentary sectional view of a labyrinth type seal.

It has been recognized that the inclusion of hollow organic particles, for example, of a phenolic material, in an amount in the range of about 12—20 weight percent in a catalyzed, epoxy or modified epoxy resin results in a material which has the combination of good abradability, light weight, good integrity and good characteristics for bonding even to a smooth backup member such as of metal or plastic. Such an organic material can be cured at room temperature or can be formed more rapidly in a reasonably short time by heating at a relatively low temperature, for example about 150° F. Therefore, distortion to parts to which the material is attached is virtually eliminated. In addition, tests have shown the material to have the capability of operating up to as high as about 350° F. and to have the ability to expand or contract with a backup material, for example of metal. Repairs to areas damaged through abnormal operation, accident or on overhaul of engine components can be made in place in the engine or in field operations easily and quickly because of the room temperature or low temperature setting characteristics of the catalyzed resin.

A particular epoxy resin selected as preferable in the evaluation of the present invention is an epichlorohydrin/bisphenol A-type such as is catalyzed with a diethylenetriamine (DETA) type catalyst. Although other catalysts can be used with this type resin, the DETA type is preferred because of the exothermic reaction. This allows either air cure or oven cure capability. This preferred resin conformed with military specification MIL-R-9300 Resin, Epoxy, Low Pressure Laminating, Type I, Class I. The epoxide equivalent was 180—195 with a viscosity in the range of 100—160 poises at 25° C.

The hollow particles used in the abradable material of the seal of the present invention, in order to provide the improved characteristics, have an outside diameter of about 0.0001—0.02 inch, and preferably 0.0002—0.005 inch, with a bulk density in the range of 1—7, and preferably 3—5, pounds per cubic foot. Use of hollow particles of diameter below 0.0001 inch resulted in low abradability; use of particles of diameters above 0.02 inch resulted in material too porous for good sealing or for good structural integrity.

It has been found that the abradable material sued in the seal of the present invention can be formed as a result of mixing together, by weight 12—20 percent of the hollow particles described above, and a catalyzed epoxy or modified epoxy resin, for example one which comprises about 70—80 percent of the mixture and has been catalyzed with about 7—9 percent of the DETA or other catalyst. Lesser amounts of catalyst results in insufficient polymerization whereas more than the specified amount results in excessive reaction to the point that the resin will boil. The inclusion of hollow particles in amounts less than about 12 weight percent results in insufficient abradablilty whereas particles representing more than about 20 weight percent of the mixture results in too thick a mixture.

Referring to the drawing, FIG. 1 represents the rotary seal of the present invention in the form of a first member such as a shroud or spacer 10 cooperating with a blading member 12, one of which rotates with respect to the other. For example, blading member 12 can be attached to a rotating compressor wheel. In another example, spacer 10 can be carried between and rotate with rotating compressor wheels opposite stationary blading member 12. Bonded with spacer or shroud 10 is the above-described abradable organic material 14 opposite the blading member tips 16 which project toward abradable material 14.

During operation, such as in a gas turbine engine, blading members 12 tend to expand due to heat more rapidly than does shroud or spacer 10. Then tips 16 will tend to approach and frequently abrade material 14. This arrangement forms a rotary seal and inhibits flow of pressurized fluid, such as from stage to stage, across the tips of blading members in an axial flow compressor.

Another embodiment of the rotary seal of the present invention is shown in FIG. 2 in the form of a labyrinth seal arrangement. Labyrinth teeth 18 in juxtaposition and cooperation with substantially member 20, one of which is rotating with respect to the other, forms a labyrinth type seal creating multiple pressure drop chambers to inhibit flow through the seal. For example, such a seal frequently is used in connection with rotating turbine wheels in gas turbine engines.

When in a heated atmosphere, members 18 and 20 can grow one toward the other sometimes resulting in contact. Abradable material 14 bonded with member 20 and opposite projecting teeth 18 allows such projections to approach and, in the case of contact, abrade material 14. This forms a more efficient rotary seal arrangement without damage to the projecting teeth 18.

Thus the rotary seal of the present invention can be embodied in a variety of forms involving a rotating member and a stationary member one of which carries the abradable organic material described above and the other of which includes a projection directed generally toward the abradable material.

As was mentioned before, the novel abradable material the use of which results in the improved rotary seal of the present invention is a nonmetallic organic material comprising about 12—20 weight percent of hollow organic particles in a catalyzed epoxy or modified epoxy resin. The specifically preferred composition of such abradable material consists essentially of, by weight, 15—20 percent hollow organic particles, 7—8 percent catalyst, with the balance the epoxy or modified epoxy resin.

I claim:

1. A rotary seal comprising:
   a rotating member;
   a stationary member; and
   an abradable organic material bonded with a first of said members.
   the abradable material being the product of a mixture comprising:
   a. 12—20 weight percent hollow organic particles each having an outside diameter of about 0.0001—0.02 inch and a bulk density of about 1—7 pounds per cubic foot; and
   b. the balancing of the mixture being a resin selected from the group consisting of epoxy and modified epoxy resins;
   the other of said members including a projection directed generally toward a surface of the abradable organic material and cooperating with said surface to provide a fluid pressure drop seal between the members.

2. The rotary seal of claim 1 in a gas turbine engine and in which the abradable organic material is the product of a mixture comprising, by weight:
   12—20 percent hollow organic particles;
   70—80 percent or a resin selected from the group consisting of epoxy and modified epoxy resin; and
   7—9 percent of a catalyst for such resin.

3. The rotary seal of claim 2 in which the composition of the mixture consists essentially of, by weight:
   15—20 percent hollow organic particles;
   7—8 percent of a diethylenetriamine-type catalyst; and
   balance an epoxy resin having an epoxide equivalent of about 180—195.